(No Model.) 2 Sheets—Sheet 1.

H. CAMPBELL.
RECLEANING ATTACHMENT FOR THRASHERS OR SEPARATORS.

No. 296,922. Patented Apr. 15, 1884.

Witnesses,
Robert Everett,
J. A. Rutherford

Inventor:
Howard Campbell,
By James L. Norris
Atty (No Model.) 2 Sheets—Sheet 2.
H. CAMPBELL.
RECLEANING ATTACHMENT FOR THRASHERS OR SEPARATORS.
No. 296,922. Patented Apr. 15, 1884.
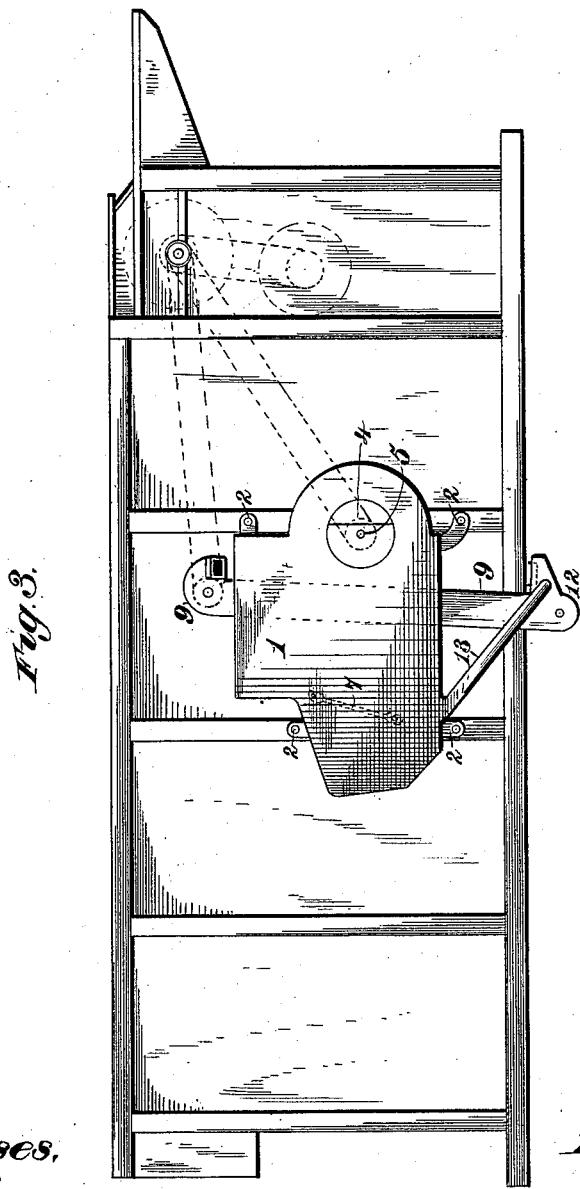

UNITED STATES PATENT OFFICE.

HOWARD CAMPBELL, OF RICHMOND, INDIANA, ASSIGNOR TO GAAR, SCOTT & COMPANY, OF SAME PLACE.

RECLEANING ATTACHMENT FOR THRASHERS OR SEPARATORS.

SPECIFICATION forming part of Letters Patent No. 296,922, dated April 15, 1884.

Application filed December 7, 1883. (No model.)

*To all whom it may concern:*

Be it known that I, HOWARD CAMPBELL, a citizen of the United States, residing at Richmond, in the county of Wayne and State of Indiana, have invented new and useful Improvements in Recleaning Attachments for Thrashers or Separators, of which the following is a specification.

This invention has for its objects to provide a seed-recleaning attachment for thrashers, separators, and clover-hullers with an adjustable screen, (one or more,) for facilitating or retarding the discharge of seed and chaff from the screen, and to provide means whereby the tailings are automatically carried back to the receiving-hopper of the attachment for the second recleaning operation.

The objects of my invention are accomplished in the manner and by the means hereinafter described and claimed, reference being had to the accompanying drawings, in which—

Figure 1:
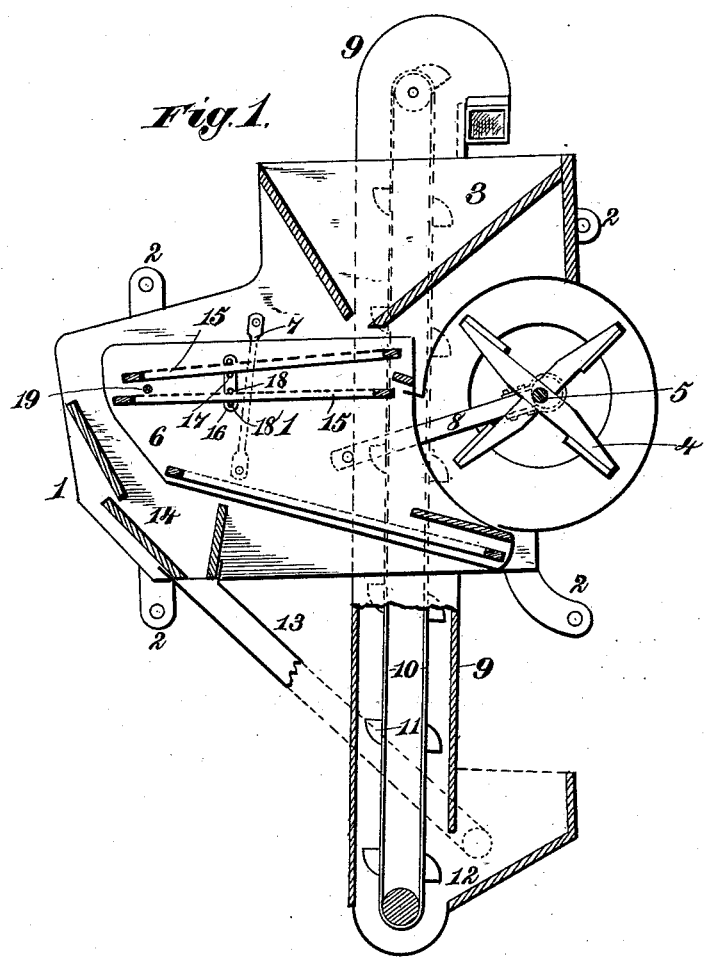
Figure 2:
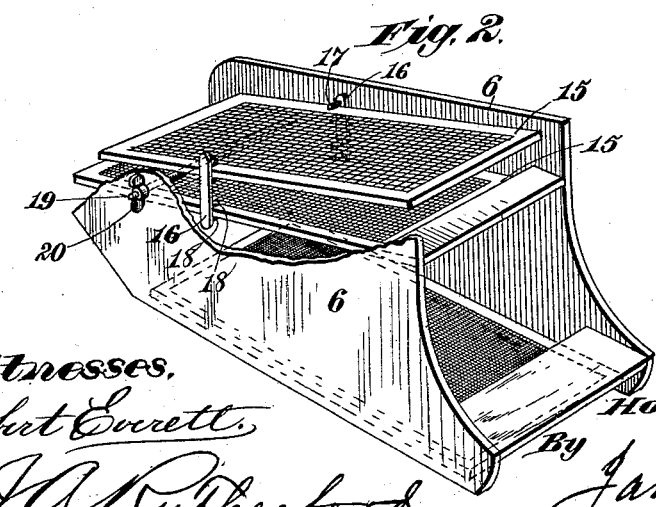

Figure 1 is a longitudinal sectional view taken vertically through the apparatus; Fig. 2, a broken perspective view of the shoe carrying the screens; and Fig. 3, a side elevation of a clover hulling and separating machine, showing the recleaning apparatus connected therewith.

Referring to the drawings, the number 1 indicates the main frame, having lugs 2 or other means for securing it to the frame of the huller or separator; 3, the receiving-hopper; 4, the fan or blower; 5, the shaft therefor; 6, the shoe; 7, the hangers by which the shoe is suspended in the main frame; 8, the pitman connected with the shoe, and driven by the fan-shaft in any usual manner, for vibrating or shaking the shoe.

At one side of the main frame is arranged an elevator, composed, as here shown, of an endless band, belt, or chain, 10, traveling around top and bottom wheels, and carrying buckets 11, to take up the tailings in the receptacle 12 at the lower end of the elevator frame-work, which tailings are received in the receptacle through the inclined conducting-tube 13, which connects with said receptacle at its lower end, and is provided at its upper end with a mouth, 14, arranged under the discharge ends of the screens 15, to receive the tailings therefrom. The upper end of the elevator frame-work is provided with a discharge-spout, which overhangs the hopper 3, to deliver the tailings thereto, which are elevated by the buckets on the endless belt.

To each of the upright sides of the shoe is secured in any suitable manner—for instance, by bolts—a plate, 16, having two pairs of cylindrical pins, 17 17, 18 18, between the upper pairs, 17, of which are arranged the side edges of the upper screen, while between the lower pairs, 18, are arranged the side edges of the lower screens, in such manner that the screens are pivotally mounted in the shoe adjacent to or at the centers of their length, and therefore can be oscillated for the purpose of bringing them either into a horizontal plane or at any desired angle thereto for controlling the discharge of the seed and chaff according to the unequal feed of the machine. If the quantity of seed and chaff delivered to the hopper is large, the outer ends of the screens are lowered to facilitate or expedite the passage and discharge of the seed and chaff; but if the quantity is small, then the outer ends of the screens are raised more or less, thereby retarding this passage and discharge. The screens are held in any adjusted positions by means of a rod, 19, passing through the upright sides of the shoe, at a point preferably between the screens, said rod having a screw-nut, 20, or other device whereby the sides of the shoe can be clamped against the longitudinal edges of the screens, to hold the latter after they have been properly adjusted. In seed-cleaners heretofore in use the seed and chaff, when thrown into the hopper unequally—sometimes in larger and sometimes in smaller quantities—"loads" the screen, and seed is carried over; or when a small quantity is thrown into the hopper the seed is blown over by reason of improperly-constructed sieves and the absence of convenient means for readily and rapidly adjusting the sieves to the constant changes in the quantity of seed and chaff delivered to them.

The manner of mounting the screens in my invention provides for their ready adjustment horizontally and at an inclination, and as they are pivotally mounted adjacent to or at their centers, a slight adjustment appreciably affects their entire length and places them at the required elevation or depression.

The elevating attachment is, it will be obvious, capable of being applied to one side of a clover-hulling machine or other thrasher or separator, and the fan or blower and the elevator will be driven by belting their shafts with some revolving shaft of the machine, as represented by dotted lines, Fig. 3.

I have shown two screens arranged in the shaking shoe, but do not confine myself to any particular number, as one screen can be used with advantage. I have also shown the pivotal bearings of the screens as applied to plates secured to the sides of the shoe; but the pins can, if desired, be secured directly to the shoe and the plates omitted.

I am aware that it is old to support screens within a shoe on pivots at their centers, and also that it is old to provide the sides of a shoe with lateral projections or pins to support the screens at both ends, said pins being so arranged that by sliding out the screens and changing their inclination, and then sliding them between a different set of the pins, the screens may be adjusted and supported at different angles. My invention differs therefrom in supporting the screens as I have herein particularly described, whereby the screens can be readily adjusted to their places horizontally, and also adjusted to different inclinations for turning the same on their pivotal points without withdrawal from their supports.

Having thus described my invention, what I claim is—

1. The combination of the shaking shoe, the plates fixed to the shoe-sides, and each provided with a pair of lateral pins, the top screen having its side edges adjacent to the centers of their length supported between the pairs of pins, to oscillate in a vertical plane between the pins, and devices for holding the screen when oscillated to adjust it to the desired plane, substantially as described.

2. A recleaning attachment for grain-separators, combining in its structure the receiving-hopper, a screen for receiving the grain from the hopper, an elevator having a chamber at its lower end, and its upper end arranged to deliver the grain to the hopper, and an inclined conductor having one end connected directly with the chamber of the elevator, and its upper end formed into a mouth arranged under the discharge-mouth of the screen, to convey the tailings to the chamber of the elevator, substantially as described.

In testimony whereof I have hereunto set my hand in the presence of two subscribing witnesses.

HOWARD CAMPBELL.

Witnesses:
JOSEPH B. CRAIGHEAD,
WM. W. GAAR.